United States Patent
Nakanishi et al.

(10) Patent No.: US 8,574,421 B2
(45) Date of Patent: Nov. 5, 2013

(54) WATER SPLITTING APPARATUS AND METHOD OF USING THE SAME

(75) Inventors: Haruyuki Nakanishi, Susono (JP); Hidekazu Arikawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 265 days.

(21) Appl. No.: 12/720,402

(22) Filed: Mar. 9, 2010

(65) Prior Publication Data

US 2011/0220515 A1 Sep. 15, 2011

(51) Int. Cl.
C25B 1/04 (2006.01)

(52) U.S. Cl.
USPC ........................................................ 205/340

(58) Field of Classification Search
USPC ..................... 205/340; 204/252; 257/E25.009
See application file for complete search history.

(56) References Cited

U.S. PATENT DOCUMENTS

| 4,021,323 | A | * | 5/1977 | Kilby et al. | 136/246 |
| 4,090,933 | A | * | 5/1978 | Nozik | 205/340 |
| 5,186,794 | A | * | 2/1993 | Parker et al. | 205/340 |
| 5,785,768 | A | * | 7/1998 | Nakata | 205/340 |
| 5,863,491 | A | * | 1/1999 | Wang | 266/101 |
| 6,198,037 | B1 | | 3/2001 | Nakata | |

FOREIGN PATENT DOCUMENTS

| GB | 2414243 A | * | 11/2005 |
| JP | A-10-218601 | | 8/1998 |
| JP | A-2001-213608 | | 8/2001 |
| JP | A-2001-286749 | | 10/2001 |
| JP | 2006176835 A | * | 7/2006 |
| JP | A-2008-075097 | | 4/2008 |
| WO | WO99/38215 | | 7/1999 |
| WO | WO 2010021551 A1 | * | 2/2010 |
| WO | WO 2011030546 A1 | * | 3/2011 |

* cited by examiner

*Primary Examiner* — Keith Hendricks
*Assistant Examiner* — Colleen M Raphael
(74) *Attorney, Agent, or Firm* — Oliff & Berridge, PLC

(57) ABSTRACT

A water-splitting apparatus and method generating hydrogen and oxygen at separate electrodes have a structure enabling a photo catalytic reaction to be efficiently performed. The apparatus includes a photolysis element having an N-type water-splitting electrode surface and a P-type water-splitting electrode surface at the opposite side surface to the N-type water-splitting electrode surface, a hydrogen generating cell holding the N-type water-splitting electrode surface and collecting the hydrogen generated at that water-splitting electrode surface, and an oxygen generating cell holding the P-type water-splitting electrode surface, collecting the oxygen generated at that water-splitting electrode surface, and adjoining the hydrogen generating cell across the photolysis element. The photolysis element has through holes enabling circulation of water between the hydrogen and oxygen generating cells. The through holes are arranged so that light irradiated on one of the N-type and P-type water-splitting electrode surfaces does not pass through to the opposite side water-splitting electrode surface.

16 Claims, 6 Drawing Sheets

(a) (b)

(a) (b)

FIG.8
(a)
(b)
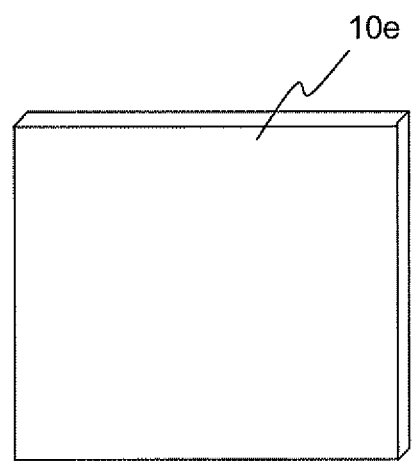
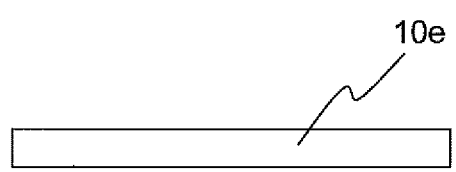
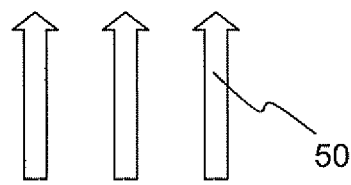
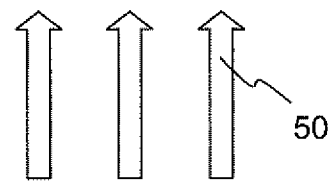
PRIOR ART

WATER SPLITTING APPARATUS AND METHOD OF USING THE SAME

SUMMARY OF INVENTION

The present invention relates to a water-splitting apparatus using a photo catalyst to split water, and a method for using the apparatus.

BACKGROUND ART

In recent years, many proposals have been made for the use of the clean energy hydrogen as an energy source.

To produce hydrogen, the general technique used has been steam reforming using a hydrocarbon fuel. Further, in recent years, it has been considered to obtain hydrogen from water by the splitting of water, in particular the splitting of water using solar light energy. When obtaining hydrogen by the splitting of water, the product obtained sometimes becomes a mixture of hydrogen, oxygen, and water. In this case, to obtain the hydrogen, it is necessary to separate and take out only this hydrogen from this mixture.

In relation to this, Japanese Unexamined Patent Publication (A) No. 2001-213608, Japanese Patent Publication (A) No. 10-218601, International Patent Publication WO99/38215, and Japanese Unexamined Patent Publication (A) No. 2008-075097 propose water-splitting apparatuses using water to catalytically or electrolytically split water wherein the hydrogen and oxygen are generated at separate electrodes and thereby the hydrogen and oxygen are separately recovered.

SUMMARY OF INVENTION

In the present invention, a water-splitting apparatus generating hydrogen and oxygen at separate electrodes and structured to enable a photo catalytic reaction to be efficiently performed, and a method for using the same are provided.

The water-splitting apparatus of the present invention has a photolysis element having an N-type water-splitting electrode surface and a P-type water-splitting electrode surface at the opposite side surface to the N-type water-splitting electrode surface, and using light irradiated on at least one of the N-type and P-type water-splitting electrode surfaces to split the water, and thereby generate hydrogen at the N-type water-splitting electrode surface and generate oxygen at the P-type water-splitting electrode surface; a hydrogen generating cell holding the N-type water-splitting electrode surface and collecting the hydrogen generated at the N-type water-splitting electrode surface; and an oxygen generating cell holding the P-type water-splitting electrode surface, collecting the oxygen generated at the P-type water-splitting electrode surface, and adjoining the hydrogen generating cell across the photolysis element.

In this water-splitting apparatus of the present invention, the photolysis element has through holes enabling circulation of water between the hydrogen generating cell and the oxygen generating cell. The through holes are arranged so as not to allow light irradiated on one of the N-type and P-type water-splitting electrode surfaces for the splitting of water to pass through to the opposite side water-splitting electrode surface.

BRIEF DESCRIPTION OF DRAWINGS

FIG. 8 are a top view (a) and perspective view (b) of a photolysis element of a conventional water-splitting apparatus.

DESCRIPTION OF EMBODIMENTS

The water-splitting apparatus of the present invention enables the generation of hydrogen and oxygen at separate electrodes, and thereby the separate recovery of the hydrogen and oxygen.

Figure 1:
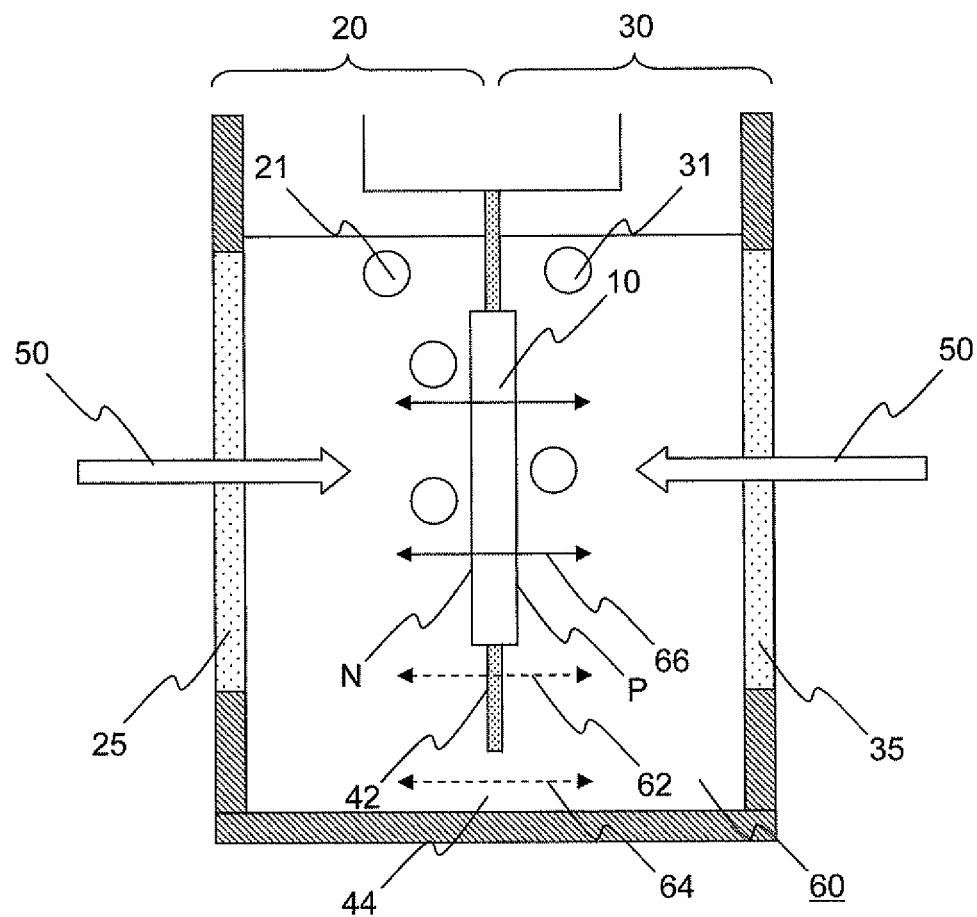
FIG. 1 is a view explaining a water-splitting apparatus of the present invention.

Specifically, for example, the water-splitting apparatus of the present invention may have the structure such as shown in FIG. 1. Here, in the mode shown in this FIG. 1, the water-splitting apparatus of the present invention has a photolysis element (10) having an N-type water-splitting electrode surface (N) and a P-type water-splitting electrode surface (P) at the opposite side surface to the N-type water-splitting electrode surface (N); a hydrogen generating cell (20) holding the N-type water-splitting electrode surface (N) and collecting the hydrogen (21) generated at the N-type water-splitting electrode surface (N); and an oxygen generating cell (30) holding the P-type water-splitting electrode surface (P), collecting the oxygen (31) generated at the P-type water-splitting electrode surface (P), and adjoining the hydrogen generating cell (20) across the photolysis element (10).

Figure 2:
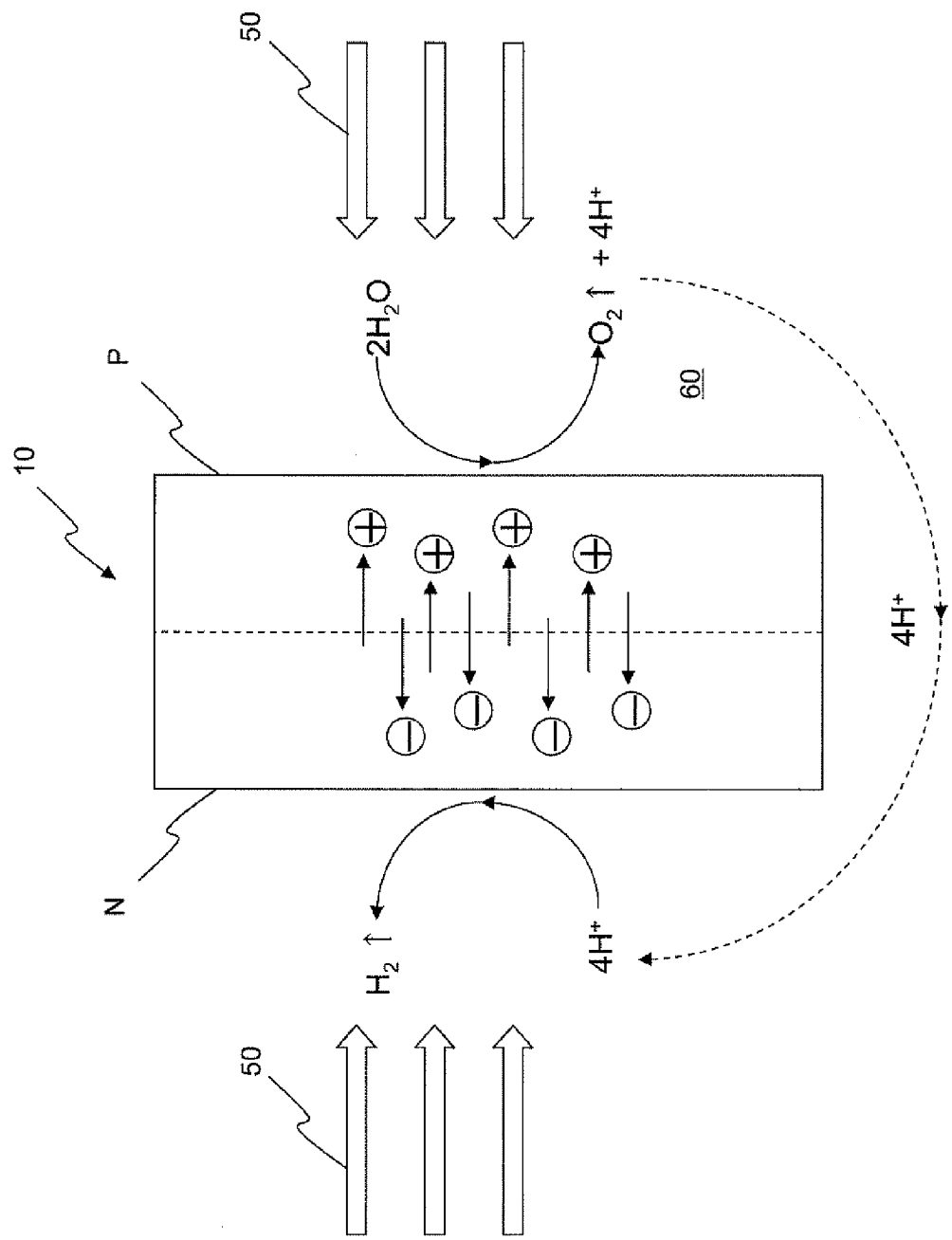
FIG. 2 is a view explaining the action of one mode of the water-splitting apparatus of the present invention.

Here, the photolysis element (10) which is used in the water-splitting apparatus of the present invention, as shown in FIG. 2, has the N-type water-splitting electrode surface (N) and an opposite side P-type water-splitting electrode surface (P). Light (50) irradiated on at least one of the N-type and P-type water-splitting electrode surfaces through the transparent window parts (25, 35) of the hydrogen generating cell (20) and/or oxygen generating cell (30) splits the water (60) to cause the generation of hydrogen at the N-type water-splitting electrode surface, and cause the generation of oxygen at the P-type water-splitting electrode surface.

Figure 3:
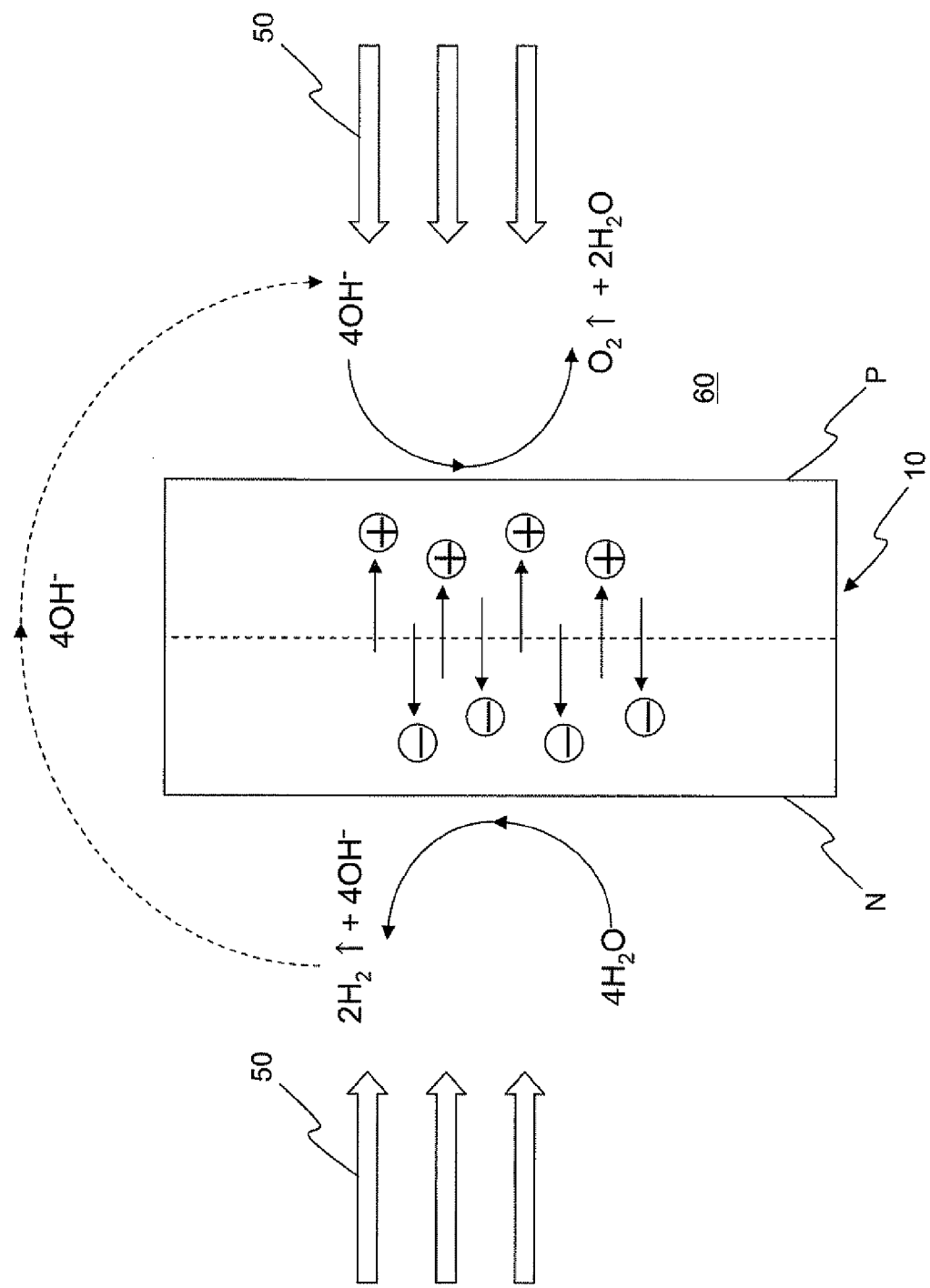
FIG. 3 is a view explaining the action of another mode of the water-splitting apparatus of the present invention.

More specifically, as shown in FIG. 2, the light (50) irradiated on at least one of the N-type and P-type water-splitting electrode surfaces provides the N-type water-splitting electrode surface (N) with electrons (−) so as to generate hydrogen ($H_2$) from hydrogen ions ($H^+$), and provides the P-type water-splitting electrode surface (P) with holes (+) so as to generate oxygen ($O_2$) and hydrogen ions ($H^+$) from water molecules ($H_2O$). Note that when the water to be split contains more hydroxide ions ($OH^-$) than hydrogen ions, this reaction can be expressed as shown in FIG. 3.

In the water-splitting apparatus of the present invention, the photolysis element has through holes enabling circulation of water between the hydrogen generating cell and the oxygen generating cell. The through holes are arranged so as not to allow light irradiated on at least one of the N-type and P-type water-splitting electrode surfaces for the splitting of water to pass through to the opposite side water-splitting electrode surface.

That is, in the water-splitting apparatus of the present invention, as shown in FIG. 1, in addition to or in place of enabling circulation of water (60) through an optional ion exchange film (42) and cell communicating hole (44) between the hydrogen generating cell (20) and the oxygen generating cell (30) as shown by the arrow marks (62, 64), it is possible to enable circulation of water (60) through the through holes of the photolysis element (10) between the hydrogen generating cell (20) and oxygen generating cell (30) as shown by the arrow marks (66).

According to the apparatus of the present invention, the photolysis element has through holes enabling the circulation of water between the hydrogen generating cell and the oxygen generating cell, so movement of the electrolytic solution between the N-type water-splitting electrode surface side arranged in the hydrogen generating cell and the P-type water-splitting electrode surface side arranged in the oxygen generating cell becomes easy. That is, for example, in this case, the hydrogen ions (H⁺) generated at the P-type water-splitting electrode surface side can quickly move to the N-type water-splitting electrode surface side.

Further, according to the apparatus of the present invention, the through holes are arranged at positions not struck by the light irradiated on at least one of the N-type and P-type water-splitting electrode surfaces for splitting of water, so the presence of the through holes does not cause the water-splitting electrode to be reduced in light receiving area. That is, according to this apparatus of the present invention, the light irradiated on least one of the N-type and P-type water-splitting electrode surfaces can be effectively utilized.

The through holes of the photolysis element of the water-splitting apparatus of the present invention may be arranged in any manner so long as not allowing light irradiated on at least one of the N-type and P-type water-splitting electrode surfaces for the splitting of water to pass through to the opposite side water-splitting electrode surface.

Therefore, for example, the through holes may also be formed in a direction different from the incident direction of the light irradiated on at least one of the N-type and P-type water-splitting electrode surfaces for the splitting of water, in particular in an angle different from this incident direction of light by 20° or more, 50° or more, or 80° or more. More particularly, the through holes may be arranged in a direction substantially perpendicular to the incident direction of light irradiated on at least one of the N-type and P-type water-splitting electrode surfaces for the splitting of water.

The through holes arranged in a direction different from the incident direction of the light may be formed in any manner.

Figure 4:
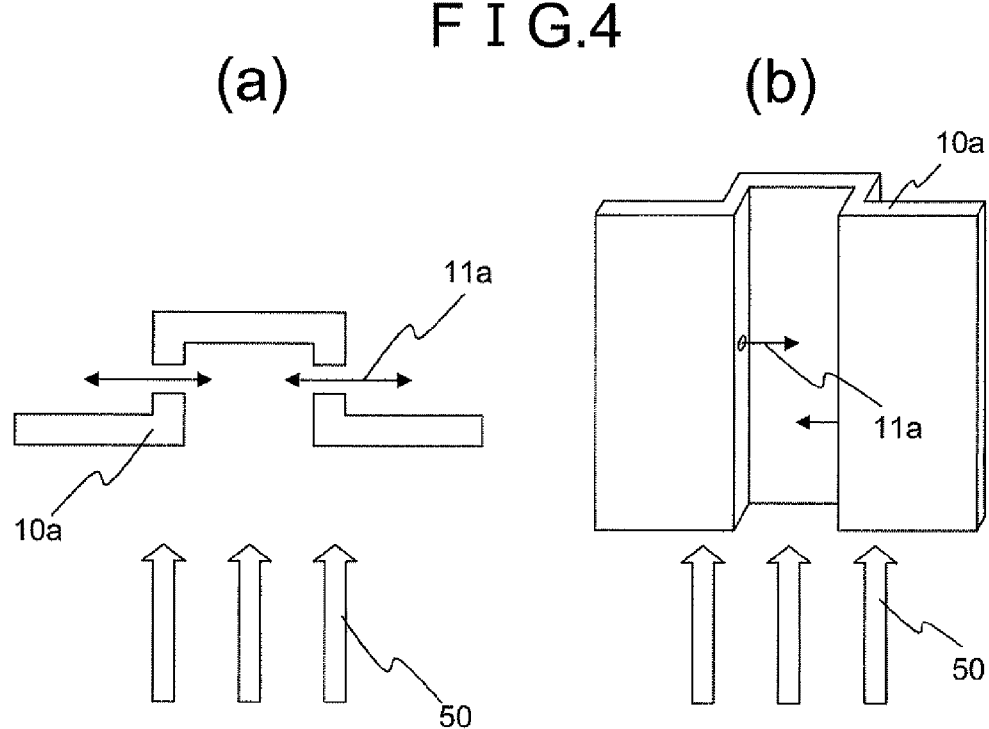
FIG. 4 are a top view (a) and perspective view (b) of a photolysis element able to be used in the water-splitting apparatus of the present invention.

Therefore, for example, as shown in FIG. 4, the photolysis element (10*a*) may have a bent structure, and the through holes may be arranged in a direction substantially perpendicular to the incident direction of light irradiated on at least one of the N-type and P-type water-splitting electrode surfaces for splitting of water. In this case, as shown by the arrow marks (11*a*), water can be circulated through the through holes between the hydrogen generating cell and oxygen generating cell.

Figure 5:
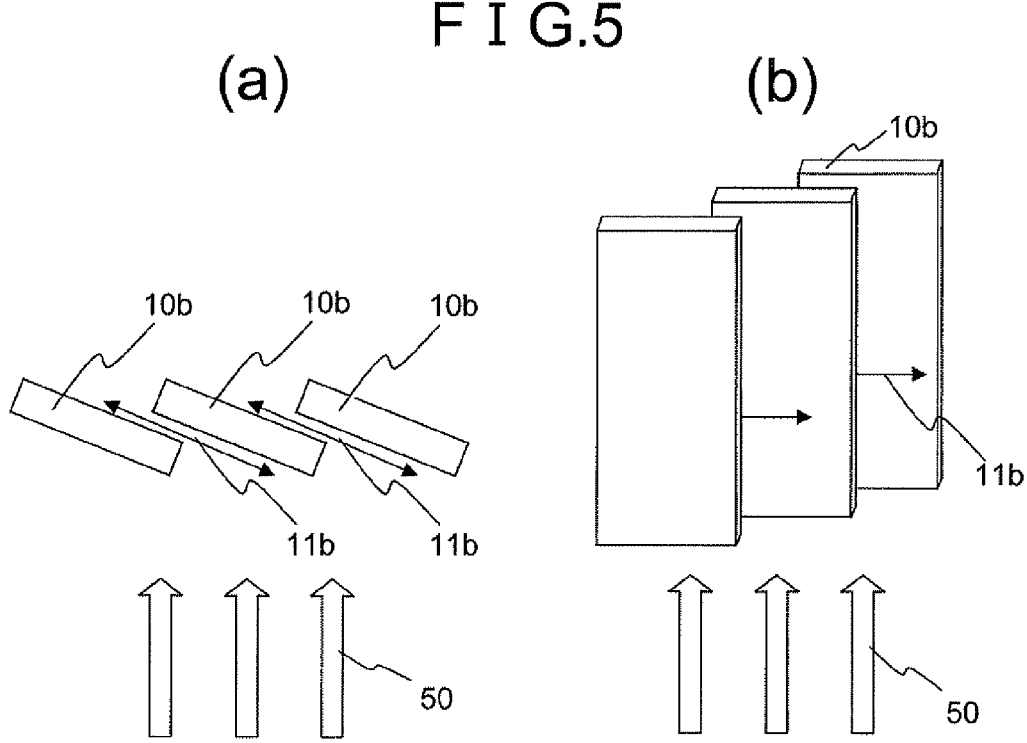
FIG. 5 are a top view (a) and perspective view (b) of another photolysis element of the water-splitting apparatus of the present invention.
Figure 6:
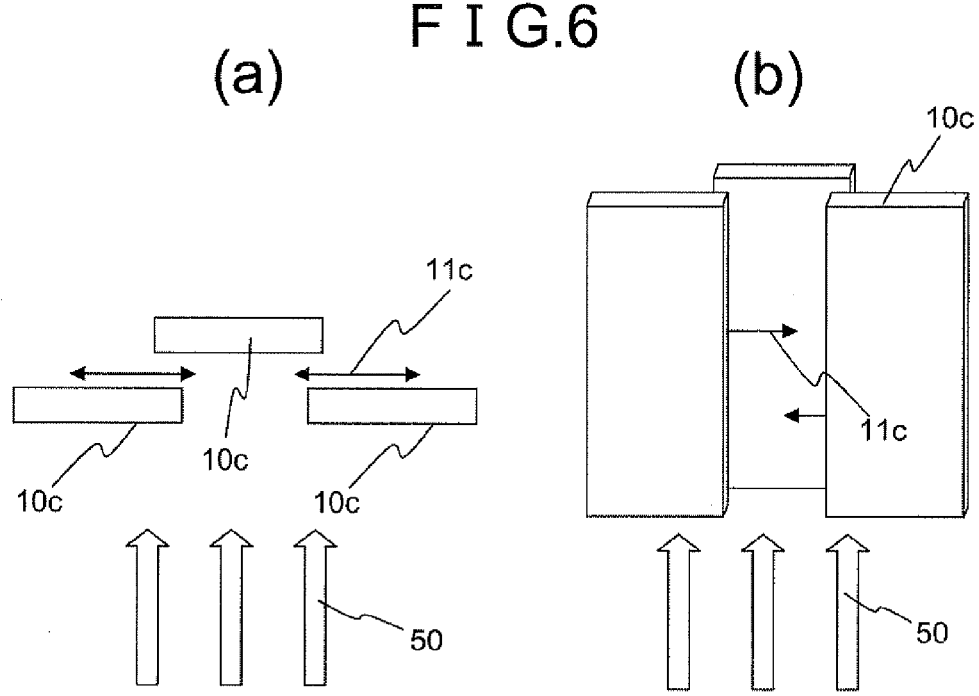
FIG. 6 are a top view (a) and perspective view (b) of another photolysis element of the water-splitting apparatus of the present invention.
Figure 7:
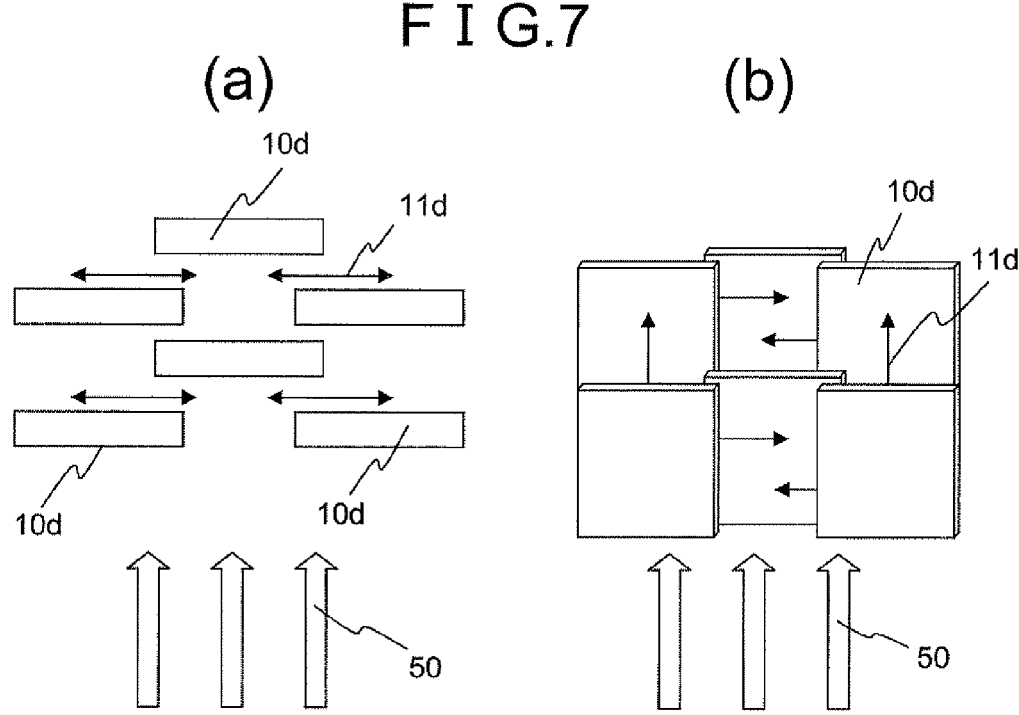
FIG. 7 are a top view (a) and perspective view (b) of another photolysis element of the water-splitting apparatus of the present invention.

Further, for example, as shown in FIGS. 5 to 7, the photolysis element may also be comprised of a group of a plurality of secondary photolysis elements (10*b*, 10*c*, and 10*d*) stacked offset from each other, and thereby having "through holes" formed as spaces between the plurality of secondary photolysis elements. In this case, as shown by the arrow marks (11*b*, 11*c*, and 11*d*), water can be circulated through the through holes between the hydrogen generating cell and oxygen generating cell.

Note that, a plurality of secondary photolysis elements (10*b*, 10*c*, and 10*d*) may be partially combined, fastened at the ends, etc. to form them into a single unit for use as a photolysis element. Further, the plurality of secondary photolysis elements (10*b*, 10*c*, and 10*d*) may, for example, be made strip shapes of widths of 10 μm to 100 mm. Still further, two or more, five or more, 10 or more, or 100 or more photolysis elements (10*b*, 10*c*, and 10*d*) may be grouped together to form a photolysis element.

Still further, the photolysis element may be made porous. Due to this, the "through holes" may also be formed as interconnected pores comprised of pluralities of pores connected together.

Note that, the conventional photolysis element (10*e*), as shown in FIG. 8, is formed as a single unit. Further, it does not have through holes enabling the circulation of water between the hydrogen generating cell and the oxygen generating cell.

In the use of the water-splitting apparatus of the present invention, water an optional electrolyte are filled in the hydrogen generating cell and oxygen generating cell, then light, in particular sunlight, is irradiated on at least one of the N-type and P-type water-splitting electrode surfaces of the photolysis element to split the water, and generate hydrogen at the N-type water-splitting electrode surface and generate oxygen at the P-type water-splitting electrode surface.

Here, as the optional electrolyte able to be placed together with water in the hydrogen generating cell and oxygen generating cell, it is preferable to use an electrolyte resistant to be degraded during the splitting of water by the water-splitting apparatus of the present invention. Therefore, for example, as this electrolyte, sodium hydroxide may be used.

For the specific production of the photolysis element used in the water-splitting apparatus of the present invention, for example, Japanese Unexamined Patent Publication (A) No. 2001-213608 may be referred to. That is, this photolysis element may be a stack having a titanium oxide layer serving as a P-type water-splitting electrode surface for generating oxygen, a metal titanium layer serving as an N-type water-splitting electrode surface for generating hydrogen, and a platinum layer between these titanium oxide layer and metal titanium layer. Note that, it is also possible to make the titanium oxide layer carry ruthenium oxide particles as an oxygen generation catalyst, and/or make the metal titanium layer carry platinum particles as a hydrogen generation catalyst.

Further, this photolysis element, for example, may also be a stack having a titanium oxide layer serving as a P-type water-splitting electrode surface for generating oxygen, a titanium oxynitride layer serving as an N-type water-splitting electrode surface for generating hydrogen, and an optional platinum layer between these titanium oxide layer and titanium oxynitride layer.

The invention claimed is:
1. A water-splitting apparatus comprising:
a photolysis element having an N-type water-splitting electrode surface and a P-type water-splitting electrode surface at an opposite side surface to the N-type water-splitting electrode surface, and using light irradiated on at least one of the N-type and P-type water-splitting electrode surfaces to split the water and thereby generate hydrogen at the N-type water-splitting electrode surface and generate oxygen at the P-type water-splitting electrode surface, a hydrogen generating cell holding the N-type water-splitting electrode surface and collecting the hydrogen generated at the N-type water-splitting electrode surface, and an oxygen generating cell holding the P-type water-splitting electrode surface, collecting the oxygen generated at the P-type water-splitting electrode surface, and adjoining the hydrogen generating cell across the photolysis element, wherein the N-type water-splitting electrode surface and the P-type water-splitting electrode surface of the photolysis element include through holes enabling circulation of water between the hydrogen generating cell and the oxygen generating cell, and the through holes are arranged so as not to allow light irradiated on one of the N-type and P-type water-splitting electrode surfaces for the splitting of water to pass through to the opposite side water-splitting electrode surface.

2. A water-splitting apparatus according to claim 1, wherein said through holes are formed in a direction different from the incident direction of the light irradiated on at least one of the N-type and P-type water-splitting electrode surfaces for the splitting of water.

3. A water-splitting apparatus according to claim 2, wherein said photolysis element is comprised of a group of a plurality of secondary photolysis elements stacked offset from each other, whereby said through holes are formed as spaces between said plurality of secondary photolysis elements.

4. A water-splitting apparatus according to claim 3, wherein said photolysis element is porous, and thereby said through holes are formed as interconnected pores comprised of pluralities of pores connected together.

5. A method of generating hydrogen and oxygen from water by using a water-splitting apparatus as set forth according to claim 4, comprising filling said hydrogen generating cell and said oxygen generating cell with water, irradiating at least one of said N-type and said P-type water-splitting electrode surfaces with light, and thereby splitting the water in said hydrogen generating cell and said oxygen generating cell to generate hydrogen at the N-type water-splitting electrode surface and generate oxygen at the P-type water-splitting electrode surface.

6. A method of generating hydrogen and oxygen from water by using a water-splitting apparatus as set forth according to claim 3, comprising filling said hydrogen generating cell and said oxygen generating cell with water, irradiating at least one of said N-type and said P-type water-splitting electrode surfaces with light, and thereby splitting the water in said hydrogen generating cell and said oxygen generating cell to generate hydrogen at the N-type water-splitting electrode surface and generate oxygen at the P-type water-splitting electrode surface.

7. A water-splitting apparatus according to claim 2, wherein said photolysis element is porous, and thereby said through holes are formed as interconnected pores comprised of pluralities of pores connected together.

8. A method of generating hydrogen and oxygen from water by using a water-splitting apparatus as set forth according to claim 7, comprising filling said hydrogen generating cell and said oxygen generating cell with water, irradiating at least one of said N-type and said P-type water-splitting electrode surfaces with light, and thereby splitting the water in said hydrogen generating cell and said oxygen generating cell to generate hydrogen at the N-type water-splitting electrode surface and generate oxygen at the P-type water-splitting electrode surface.

9. A method of generating hydrogen and oxygen from water by using a water-splitting apparatus as set forth according to claim 2, comprising filling said hydrogen generating cell and said oxygen generating cell with water, irradiating at least one of said N-type and said P-type water-splitting electrode surfaces with light, and thereby splitting the water in said hydrogen generating cell and said oxygen generating cell to generate hydrogen at the N-type water-splitting electrode surface and generate oxygen at the P-type water-splitting electrode surface.

10. A water-splitting apparatus according to claim 1, wherein said photolysis element is comprised of a group of a plurality of secondary photolysis elements stacked offset from each other, whereby said through holes are formed as spaces between said plurality of secondary photolysis elements.

11. A water-splitting apparatus according to claim 10, wherein said photolysis element is porous, and thereby said through holes are formed as interconnected pores comprised of pluralities of pores connected together.

12. A method of generating hydrogen and oxygen from water by using a water-splitting apparatus as set forth according to claim 11, comprising filling said hydrogen generating cell and said oxygen generating cell with water, irradiating at least one of said N-type and said P-type water-splitting electrode surfaces with light, and thereby splitting the water in said hydrogen generating cell and said oxygen generating cell to generate hydrogen at the N-type water-splitting electrode surface and generate oxygen at the P-type water-splitting electrode surface.

13. A method of generating hydrogen and oxygen from water by using a water-splitting apparatus as set forth according to claim 10, comprising filling said hydrogen generating cell and said oxygen generating cell with water, irradiating at least one of said N-type and said P-type water-splitting electrode surfaces with light, and thereby splitting the water in said hydrogen generating cell and said oxygen generating cell to generate hydrogen at the N-type water-splitting electrode surface and generate oxygen at the P-type water-splitting electrode surface.

14. A water-splitting apparatus according to claim 1, wherein said photolysis element is porous, and thereby said through holes are formed as interconnected pores comprised of pluralities of pores connected together.

15. A method of generating hydrogen and oxygen from water by using a water-splitting apparatus as set forth according to claim 14, comprising filling said hydrogen generating cell and said oxygen generating cell with water, irradiating at least one of said N-type and said P-type water-splitting electrode surfaces with light, and thereby splitting the water in said hydrogen generating cell and said oxygen generating cell to generate hydrogen at the N-type water-splitting electrode surface and generate oxygen at the P-type water-splitting electrode surface.

16. A method of generating hydrogen and oxygen from water by using a water-splitting apparatus as set forth according to claim 1, comprising filling said hydrogen generating cell and said oxygen generating cell with water, irradiating at least one of said N-type and said P-type water-splitting electrode surfaces with light, and thereby splitting the water in said hydrogen generating cell and said oxygen generating cell to generate hydrogen at the N-type water-splitting electrode surface and generate oxygen at the P-type water-splitting electrode surface.

\* \* \* \* \*